(12) United States Patent
Hu et al.

(10) Patent No.: US 10,996,484 B2
(45) Date of Patent: May 4, 2021

(54) OPTICAL SYSTEM

(71) Applicant: TDK TAIWAN CORP., Taoyuan (TW)

(72) Inventors: Chao-Chang Hu, Taoyuan (TW); Cheng-Kai Yu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 188 days.

(21) Appl. No.: 15/994,056

(22) Filed: May 31, 2018

(65) Prior Publication Data

US 2018/0356646 A1 Dec. 13, 2018

Related U.S. Application Data

(60) Provisional application No. 62/516,255, filed on Jun. 7, 2017.

(30) Foreign Application Priority Data

May 18, 2018 (CN) .......................... 201820749076.8

(51) Int. Cl.
*G02B 27/64* (2006.01)
*G02B 7/10* (2021.01)
(Continued)

(52) U.S. Cl.
CPC ............. *G02B 27/646* (2013.01); *G02B 7/08* (2013.01); *G02B 7/09* (2013.01); *G02B 7/10* (2013.01);
(Continued)

(58) Field of Classification Search
CPC .......... G02B 27/646; G02B 7/02; G02B 7/08; G02B 7/09; G02B 7/10; G02B 7/04; G02B 7/28; G02B 7/282; G03B 3/10; G03B 2205/0007; G03B 2205/0015; G03B 2205/0069; G03B 2205/0046; G03B 2205/0053; G03B 5/00; G03B 5/02;
(Continued)

(56) References Cited

U.S. PATENT DOCUMENTS

2006/0033818 A1* 2/2006 Wada ..................... G03B 17/00
348/208.11
2010/0202766 A1* 8/2010 Takizawa ................. G03B 5/00
396/55

(Continued)

*Primary Examiner* — Marin Pichler
(74) *Attorney, Agent, or Firm* — Muncy, Geissler, Olds & Lowe P.C.

(57) ABSTRACT

An optical system is provided and includes a fixed module, a movable module, a driving coil, a sensing unit and a driving assembly. The fixed module includes an outer frame, and the movable module includes an optical member holder, configured to hold an optical member. The sensing unit is configured to obtain information related to a first rotation angle of the optical member holder when rotating around a first axis relative to the outer frame and a second rotation angle of the optical member holder when rotating around a second axis relative to the outer frame. The driving assembly is for driving the optical member holder to rotate around the first axis or the second axis according to the information related to the first rotation angle and the second rotation angle. The first axis or the second axis is perpendicular to an optical axis of the optical member.

13 Claims, 14 Drawing Sheets

(51) Int. Cl.
*G02B 7/09* (2021.01)
*G03B 13/26* (2021.01)
*G03B 13/36* (2021.01)
*G02B 7/08* (2021.01)
*G03B 3/10* (2021.01)
*G03B 5/00* (2021.01)

(52) U.S. Cl.
CPC .............. *G03B 3/10* (2013.01); *G03B 5/00* (2013.01); *G03B 13/36* (2013.01); *G03B 2205/0007* (2013.01); *G03B 2205/0069* (2013.01); *G03B 2217/005* (2013.01)

(58) Field of Classification Search
CPC . G03B 5/04; G03B 5/06; G03B 13/36; G03B 2217/005; H04N 5/2253; H04N 5/2254; H04N 5/2328; H04N 5/23287; H04N 5/23212; H02K 41/0356; H02K 5/24
USPC .............. 359/557, 824, 825; 348/208.99, 348/208.4–208.7, 208.11; 396/55
See application file for complete search history.

(56) References Cited

U.S. PATENT DOCUMENTS

| | | | |
|---|---|---|---|
| 2013/0163085 A1* | 6/2013 | Lim | G02B 7/08 359/557 |
| 2015/0192799 A1* | 7/2015 | Moriya | G03B 5/00 359/557 |
| 2015/0331251 A1* | 11/2015 | Hu | G02B 27/646 359/824 |
| 2015/0350507 A1* | 12/2015 | Topliss | H04N 5/2254 348/208.2 |

* cited by examiner

OPTICAL SYSTEM

CROSS REFERENCE TO RELATED APPLICATIONS

This application claims the benefit of U.S. Provisional Application No. 62/516,255, filed Jun. 7, 2017, and China Patent Application No. 201820749076.8, filed May 18, 2018, the entirety of which are incorporated by reference herein.

BACKGROUND OF THE DISCLOSURE

Field of the Disclosure

The present disclosure relates to an optical system, and more particularly to an optical system that can compensate for static tilt and dynamic tilt.

Description of the Related Art

As technology has progressed, many kinds of electronic devices such as smartphones and tablet computers have begun to include the functionality of digital photography and recording video. A user can operate the electronic device to capture various images through a camera module included in the electronic device.

In general, when using the electronic device, the camera module therein may vibrate due to an external shock or impact, which can blur the images captured by the camera module. Therefore, the camera module of the electronic device can have such functions as auto focusing and optical image stabilization. When the auto focusing function is executed, a current is supplied to the coil, and electromagnetic induction occurs between the coil and the corresponding magnets, so that a lens holder affixed to the coil is moved along an optical axis (i.e. along the Z direction) of the lens, thereby performing an auto focusing function. Moreover, electromagnetic induction can also occur between the coils and the magnets, corresponding to the X-axis and Y-axis directions, so as to correct the position of the lens (i.e. correct the horizontal offset of the optical axis in the X-axis and Y-axis directions). Consequently, the electronic device is shockproof and image quality is improved.

However, when a conventional electronic device is being used, the vibration of the camera module therein is actually more complicated, rather than being offset along the vertical direction and the horizontal direction. Therefore, how to design an electronic device and a camera module with better shockproof effect is a topic nowadays that needs to be discussed and solved.

BRIEF SUMMARY OF THE DISCLOSURE

Accordingly, one objective of the present disclosure is to provide an optical system to solve the above problems.

The present disclosure provides an optical system which includes a fixed module, a movable module, a driving coil, a sensing unit and a driving assembly. The fixed module includes an outer frame, and the movable module includes an optical member holder configured to hold an optical member. The sensing unit is configured to obtain information related to a first rotation angle of the optical member holder when rotating around a first axis relative to the outer frame and a second rotation angle of the optical member holder when rotating around a second axis relative to the outer frame. The driving assembly is configured to drive the optical member holder to rotate around the first axis or the second axis according to the information related to the first rotation angle and the second rotation angle. The first axis or the second axis is perpendicular to an optical axis of the optical member.

According to some embodiments, the driving assembly includes a plurality of first magnetic elements and a plurality of second magnetic elements. The first magnetic elements are disposed on the outer frame and arranged along a direction parallel to the first axis and along a direction parallel to the second axis. The second magnetic elements correspond to the first magnetic elements, and the second magnetic elements are arranged along a direction parallel to the first axis and along a direction parallel to the second axis. The sensing unit is disposed on the outer frame, and the first axis and the second axis cross the optical axis.

According to some embodiments, the optical system further includes an elastic member and a frame, the elastic member includes an inner ring portion, a middle ring portion and an outer ring portion, the inner ring portion is connected to the optical member holder, the middle ring portion is connected to the frame, and the outer ring portion is connected to the outer frame. The inner ring portion and the middle ring portion rotate relative to the outer ring portion around the first axis or the second axis.

According to some embodiments, the driving assembly further includes a driving coil corresponding to the second magnetic elements, configured to generate an electromagnetic driving force to drive the optical member holder to move along the optical axis.

According to some embodiments, when viewed along the optical axis, the driving coil partially overlaps the first magnetic elements.

According to some embodiments, the driving assembly further drives the optical member holder to move along the optical axis.

According to some embodiments, the sensing unit includes two first sensors and two second sensors. The two first sensors are arranged along a direction parallel to the first axis, configured to sense the second rotation angle. The two second sensors are arranged along a direction parallel to the second axis, configured to sense the first rotation angle.

According to some embodiments, the first sensors and the second sensors are configured to further obtain displacement of the optical member holder along the optical axis.

According to some embodiments, the sensing unit further includes a third sensor, configured to sense displacement of the optical member holder along the optical axis.

According to some embodiments, the sensing unit includes two first sensors and a second sensor. The two first sensors are arranged along a direction parallel to the first axis. The second sensor is disposed at one side of the optical member holder and is adjacent to the first sensors. The first sensors and the second sensor are configured to obtain position information and angle information about the optical member holder.

According to some embodiments, the sensing unit includes a first sensor, a second sensor and a third sensor, the first sensor and the second sensor are disposed on two adjacent sides of the optical member holder, and the third sensor is disposed in a corner of the optical member holder.

According to some embodiments, the optical system further includes a control unit which includes initial information related to the movable module, wherein the initial information includes position information and angle information about the movable module when the movable module is not activated.

According to some embodiments, the control unit further includes dynamic information related to the movable module The dynamic information includes position variation information and angle variation information about the movable module when the movable module operates within a predetermined range.

The present disclosure provides an optical system which includes a sensing unit, a driving assembly, and a control unit. When the optical member holder is moved to perform the auto-focusing function, the optical member holder may tilt, such that the optical axis of the optical member holder is not aligned with the optical axis of the image-sensing element. At this time, the sensing unit can sense the information related to the first rotation angle of the optical member holder when rotating around the first axis and/or the second rotation angle when rotating around the second axis, and then the control unit can control the driving assembly to drive the optical member holder to rotate according to the information, so as to achieve the purpose of compensating for the angle of tilt.

Furthermore, when the optical system is not activated, the optical member holder may have an angle of tilt relative to the image-sensing element. Therefore, when the optical system is activated, the control unit can immediately drive the optical member holder to compensate for the angle of tile, so that the optical axis of the optical member holder is aligned with the optical axis of the image-sensing element, so as to obtain a clear image.

In addition, the number of sensors in the sensing unit of the optical system may depend on practical requirements. For example, in some embodiments, the optical system can only include one first sensor, one second sensor and one third sensor, which are configured to respectively sense the displacement, the first rotation angle or the second rotation angle of the optical member holder. Based on the configuration, the manufacturing cost can be reduced further, and the purpose of miniaturization can be achieved.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

Figure 1:
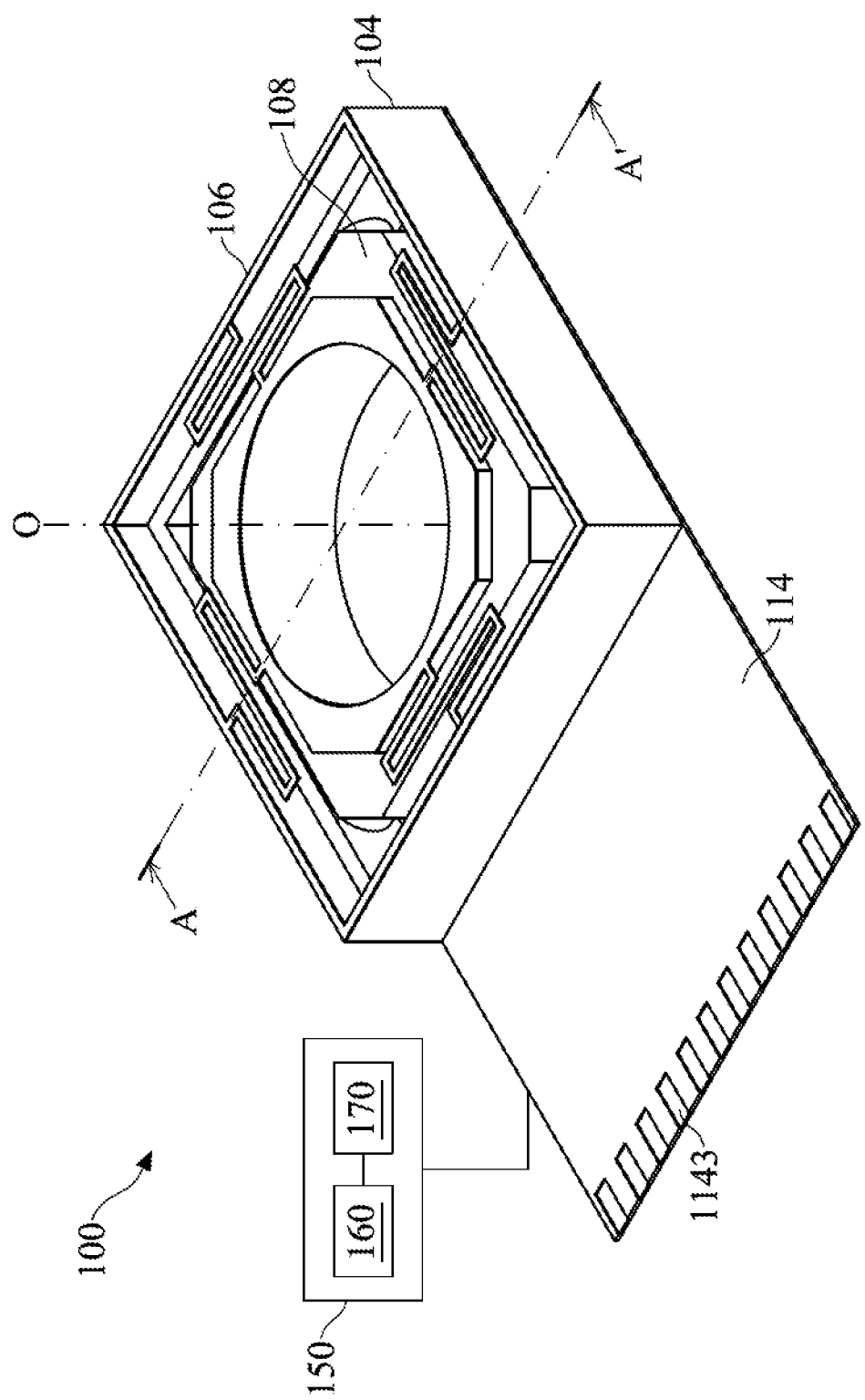
FIG. 1 shows a schematic diagram of an optical system according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
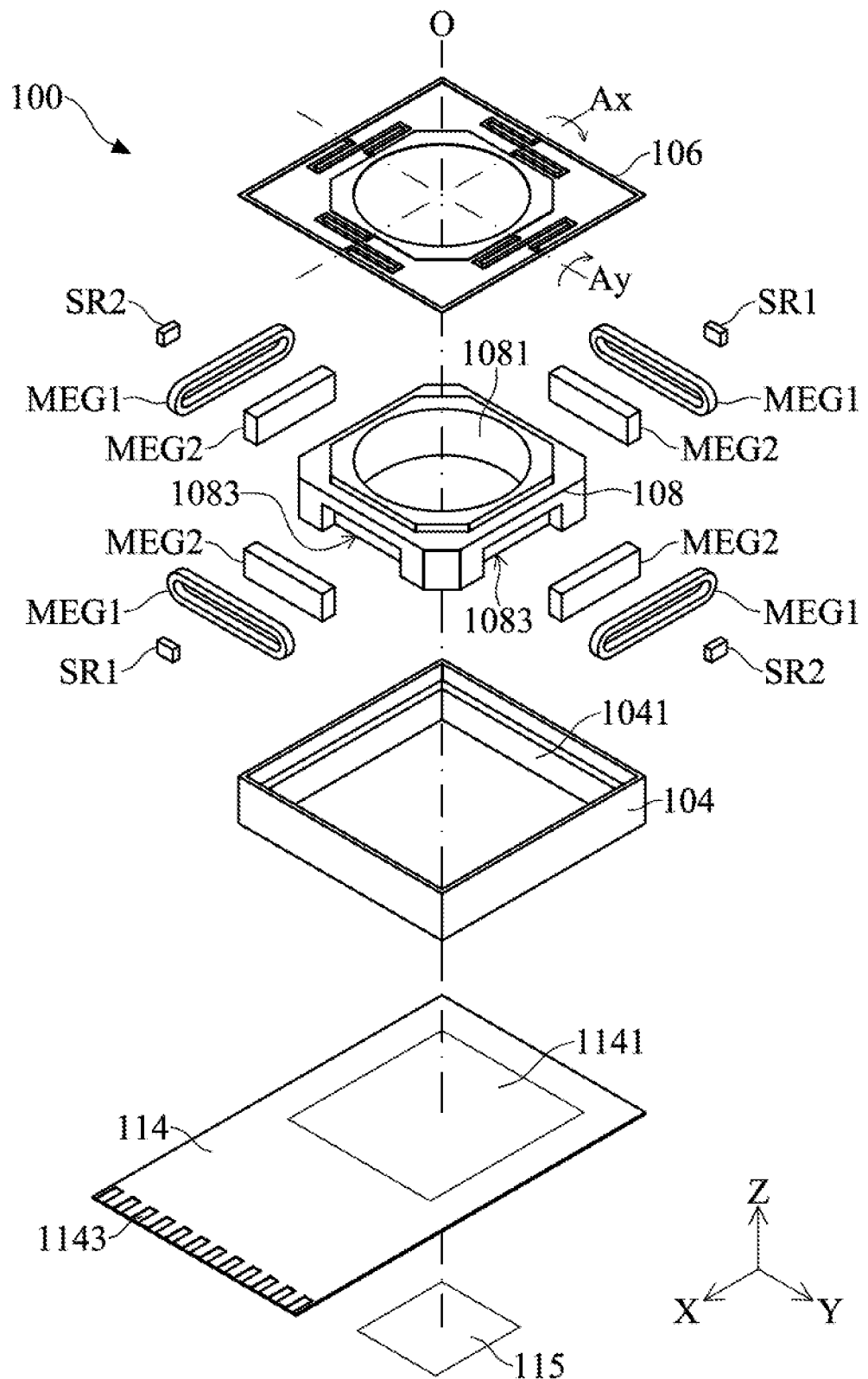
FIG. 2 shows an exploded diagram of the optical system according to the embodiment of the present disclosure.
Figure 3:
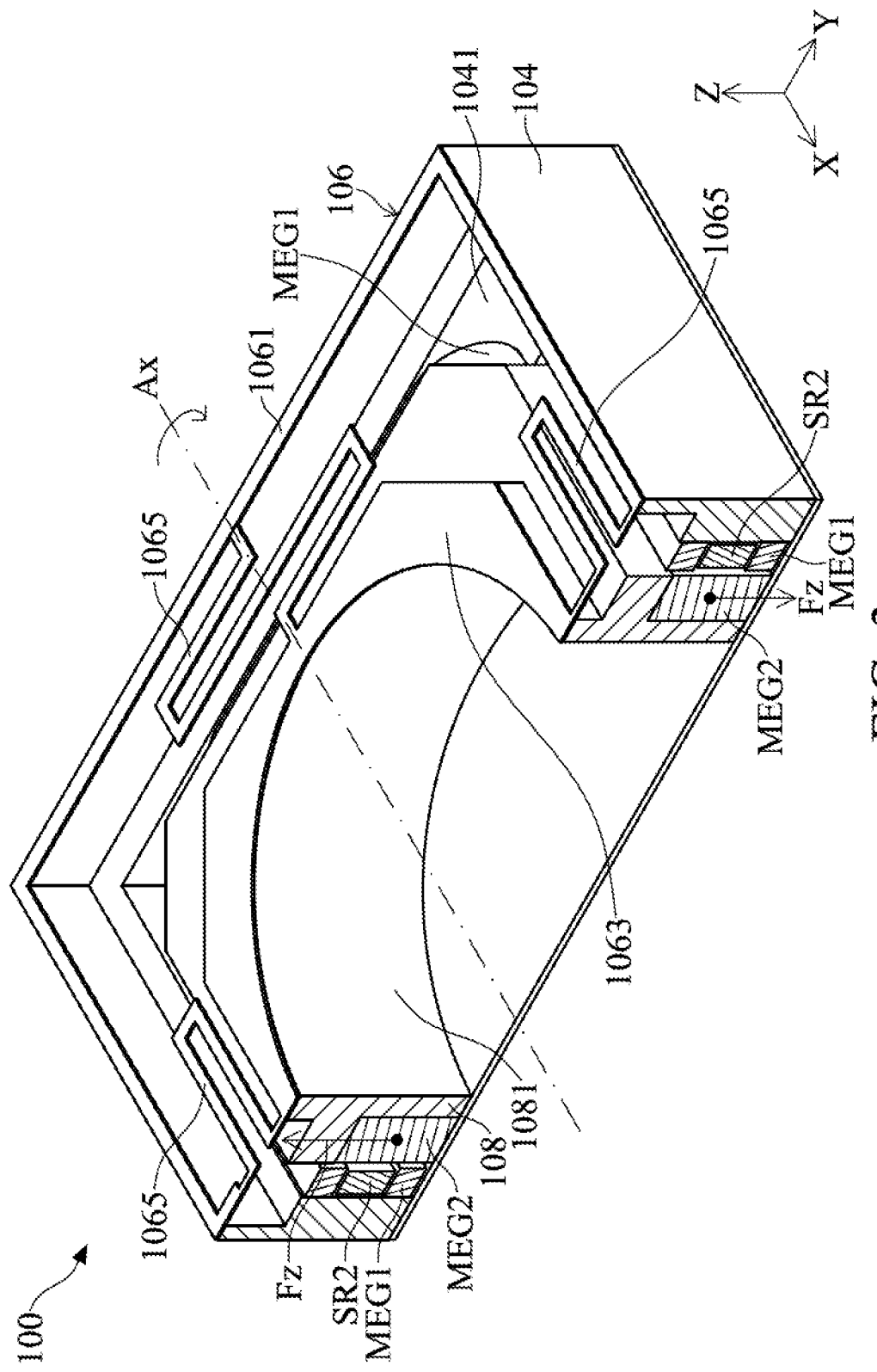
FIG. 3 shows a cross-sectional view along line A-A' in FIG. 1 according to the embodiment of the present disclosure.

Please refer to FIG. 1 to FIG. 3. FIG. 1 shows a schematic diagram of an optical system 100 according to an embodiment of the present disclosure, FIG. 2 shows an exploded diagram of the optical system 100 according to the embodiment of the present disclosure, and FIG. 3 shows a cross-sectional view along line A-A' in FIG. 1 according to the embodiment of the present disclosure. The optical system 100 can be a camera system with a driving assembly and can be configured to hold an optical member (such as a lens, not shown in the figures). The optical system 100 can be installed in different electronic devices or portable electronic devices, such as a smartphone or a tablet computer, for allowing a user to perform the image capturing function. In this embodiment, the driving assembly can be a voice coil motor (VCM) with an auto-focusing (AF) function, but it is not limited thereto. In some embodiments, the driving assembly of the optical system 100 can also perform the functions of auto-focusing, optical image stabilization (OIS), static tilt compensation and dynamic tilt compensation.

In addition, as shown in FIG. 1, the optical system 100 can also include a control unit 150. The control unit 150 can include a processor 160 and a storage unit 170. In this embodiment, the processor 160 can be a microprocessor, and the storage unit 170 can be any form of storage medium (such as random access memory) for storing data related to the optical system 100. The processor 160 in the control unit 150 is configured to control the driving assembly mentioned above according to the data stored in the storage unit 170. The control unit 150 is not limited to the implementation means described above. For example, the control unit 150 can also be a control chip.

Please refer to FIG. 1 to FIG. 3 together. In this embodiment, as shown in FIG. 2, the optical system 100 includes an outer frame 104, a spring sheet 106, an optical member holder 108, a plurality of first magnetic elements MEG1, a plurality of second magnetic elements MEG2, a sensing unit, a circuit board 114 and an image-sensing element 115 (the control unit 150 is omitted in FIG. 2). In this embodiment, the outer frame 104 is fixedly connected to the circuit board 114, such as being connected to the circuit board 114 by welding, but it is not limited thereto. Any method that is capable of fixedly connecting the outer frame 104 to the circuit board 114 is within the scope of the present disclosure. The outer frame 104 and the circuit board 114 can form a fixed module. The fixed module can include other members in other embodiments. For example, the fixed module can further include an upper casing (not shown in the figures), and the upper casing is fixedly connected to the outer frame 104. In addition, the optical member holder 108 can be included in a movable module, and the movable module can move relative to the fixed module.

As shown in FIG. 2, an opening 1141 is formed on the circuit board 114. The center of the opening 1141 corresponds to an optical axis O of an optical member (not shown) which is held by the optical member holder 108, and the opening 1141 corresponds the image-sensing element 115 disposed under the circuit board 114. The outer frame 104 can include an accommodating space 1041 for accommodating the spring sheet 106, the optical member holder 108, the first magnetic elements MEG1 and the second magnetic elements MEG2. In addition, the first magnetic elements MEG1 and the second magnetic elements MEG2 corresponding to the first magnetic elements MEG1 can be defined as the aforementioned driving assembly, and the driving assembly is electrically connected to the circuit board 114 and can drive the optical member holder 108 to move relative to the outer frame 104. For example, the optical member holder 108 can be moved along a direction of the optical axis O (optical axis O direction) or rotated around a first axis Ax and a second axis Ay shown in FIG. 2.

As shown in FIG. 2, the optical member holder 108 has a hollow ring structure and a through hole 1081. The through hole 1081 forms a threaded structure (not shown) corresponding to another threaded structure (not shown) on the optical member (not shown), so that the optical member can be locked into the through hole 1081. Moreover, as shown in FIG. 2, in this embodiment, the optical member holder 108 can further include a plurality of grooves 1083 for accommodating the four second magnetic elements MEG2, but the number of the grooves 1083 and the second magnetic elements MEG2 is not limited to this embodiment. In this embodiment, the shape of the second magnetic element MEG2 can include a long-strip structure, but it is not limited thereto. For example, it can include different shapes in other embodiments.

In addition, as shown in FIG. 1 and FIG. 2, the first magnetic elements MEG1 can be coils corresponding to the second magnetic elements MEG2, and the first magnetic elements MEG1 are fixedly disposed on an inner surface 1041 of the outer frame 104. Moreover, in this embodiment, some of the first magnetic elements MEG1 and some of the second magnetic elements MEG2 are arranged along the X-axis direction, and some of the first magnetic elements MEG1 and some of the second magnetic elements MEG2 are arranged along the Y-axis direction.

As shown in FIG. 2 and FIG. 3, in this embodiment, the sensing unit can include two first sensors SR1 and two second sensors SR2. The first sensors SR1 and the second sensors SR2 can be fixedly disposed on the inner surface 1041 of the outer frame 104, and the first magnetic elements MEG1 surround the corresponding first sensor SR1 or the corresponding second sensor SR2. The first sensors SR1 and the second sensors SR2 are configured to sense the movement of the corresponding second magnetic elements MEG2. More specifically, the two first sensors SR1 are arranged along the X-axis direction, and the two second sensors SR2 are arranged along the Y-axis direction.

The optical member holder 108 and the optical member are disposed in the outer frame 104 and are movable relative to the outer frame 104. More specifically, as shown in FIG. 3, the optical member holder 108 can be connected to the outer frame 104 by the spring sheet 106, so that the optical member holder 108 is suspended in the outer frame 104. In this embodiment, the spring sheet 106 can be an elastic member, and the spring sheet 106 can be integrally formed in one piece, but it is not limited thereto. The spring sheet 106 can include an outer ring portion 1061, an inner ring portion 1063 and a plurality of connecting portions 1065. The inner ring portion 1063 is fixedly connected to the optical member holder 108, the outer ring portion 1061 is fixedly connected to the outer frame 104, and the inner ring portion 1063 is connected to the outer ring portion 1061 by the connecting portions 1065. In this embodiment, as shown in FIG. 2, the first axis Ax and the second axis Ay can be defined by the spring sheet 106, directions of the first axis Ax and the second axis Ay are respectively parallel to the X-axis direction and the Y-axis direction, and directions of the first axis Ax and the second axis Ay are perpendicular to the first optical axis O. More specifically, the first axis Ax and the second axis Ay cross the optical axis O.

When the first magnetic elements MEG1 are provided with electricity, the first magnetic elements MEG1 act with the corresponding second magnetic elements MEG2 to generate an electromagnetic driving force, so as to drive the optical member holder 108 to move relative to the outer frame 104. For example, when the four first magnetic elements MEG1 act with the four second magnetic elements MEG2 to generate four electromagnetic driving forces, and the four electromagnetic driving forces have the same magnitude and the same direction (e.g. the Z-axis direction). At this time, the optical member holder 108 can be driven to move along the optical axis O direction (the Z-axis direction), so as to perform the auto-focusing function.

In addition, when only two first magnetic elements MEG1 arranged along the X-axis direction are provided with electricity, the two electromagnetic driving forces generated can drive the optical member holder 108 to rotate around the second axis Ay. Similarly, when only two first magnetic elements MEG1 arranged along the Y-axis direction are provided with electricity, the two electromagnetic driving forces generated can drive the optical member holder 108 to rotate around the first axis Ax. For example, as shown in FIG. 3, when currents having the same magnitude but opposite phase are supplied to the two first magnetic elements MEG1 arranged along the Y-axis direction, the first magnetic element MEG1 and the second magnetic element MEG2 at the left side provide an electromagnetic driving force Fz along the Z-axis direction, and the first magnetic element MEG1 and the second magnetic element MEG2 at the right side provide an electromagnetic driving force Fz along the −Z axis direction, so that the optical member holder 108 can be driven to rotate around the first axis Ax.

In this embodiment, the circuit board 114 can be a flexible printed circuit (FPC) board, but it is not limited thereto. As shown in FIG. 1 and FIG. 2, the circuit board 114 includes a plurality of electrical contacts 1143, configured to connect a main circuit board (not shown) and the control unit 150 of the aforementioned electronic device. In addition, the control unit 150 can also be disposed on the circuit board 114, or it can be disposed outside of the circuit board 114, such as being disposed on the main circuit board.

Figure 4:
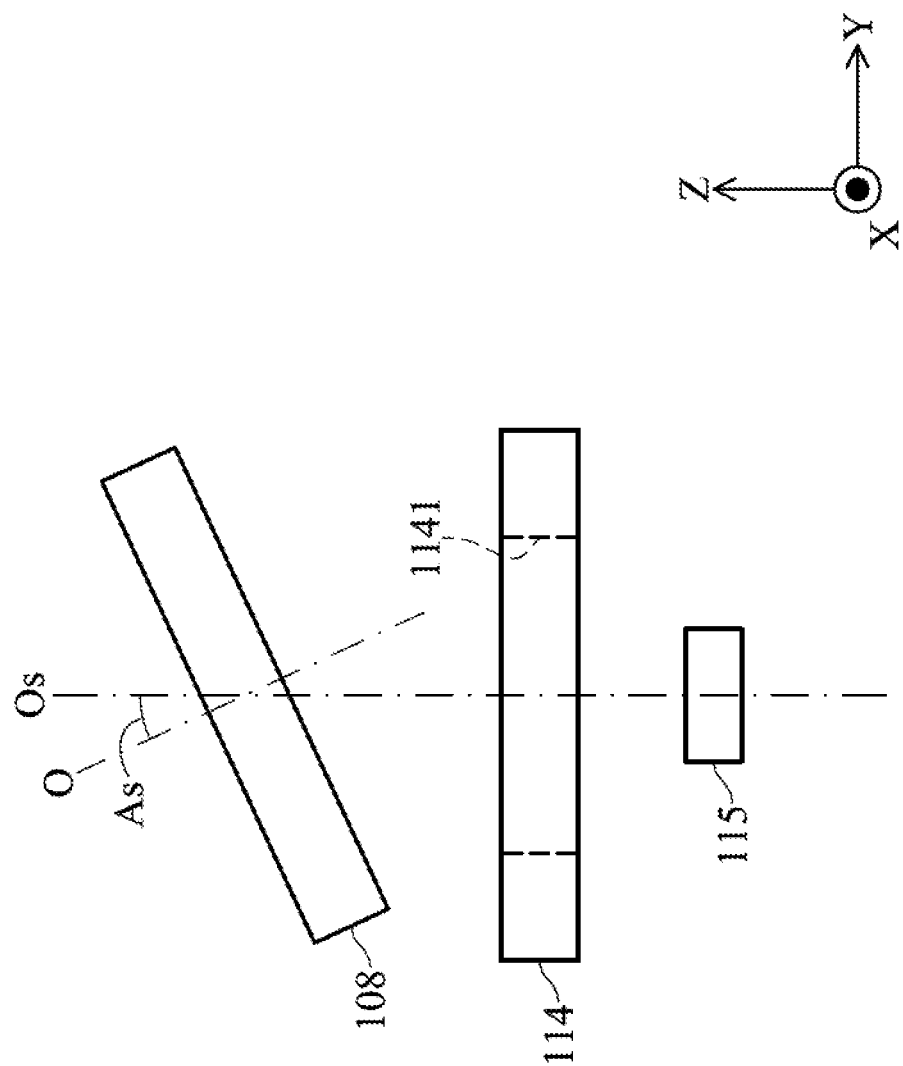
FIG. 4 shows a diagram of the optical member holder, the circuit board, and the image-sensing element according to the embodiment of the disclosure.

Please continue to refer to FIG. 4. FIG. 4 shows a diagram of the optical member holder 108, the circuit board 114, and the image-sensing element 115 according to the embodiment of the disclosure. When the optical system 100 is installed on the main circuit board and is not activated, the optical axis O of the optical member holder 108 may not be parallel to an optical axis Os of the image-sensing element 115. For example, an included angle As (angle of tilt) is formed between the optical axis O and the optical axis Os. This situation is called a static tilt, and it may result in an unclear image obtained by the image-sensing element 115. Therefore, in order to compensate for this static tilt, the control unit 150 can control the driving assembly to generate an electromagnetic driving force, so as to rotate the optical member holder 108 clockwise around the first axis Ax, so that the included angle As can be compensated for.

Figure 5:
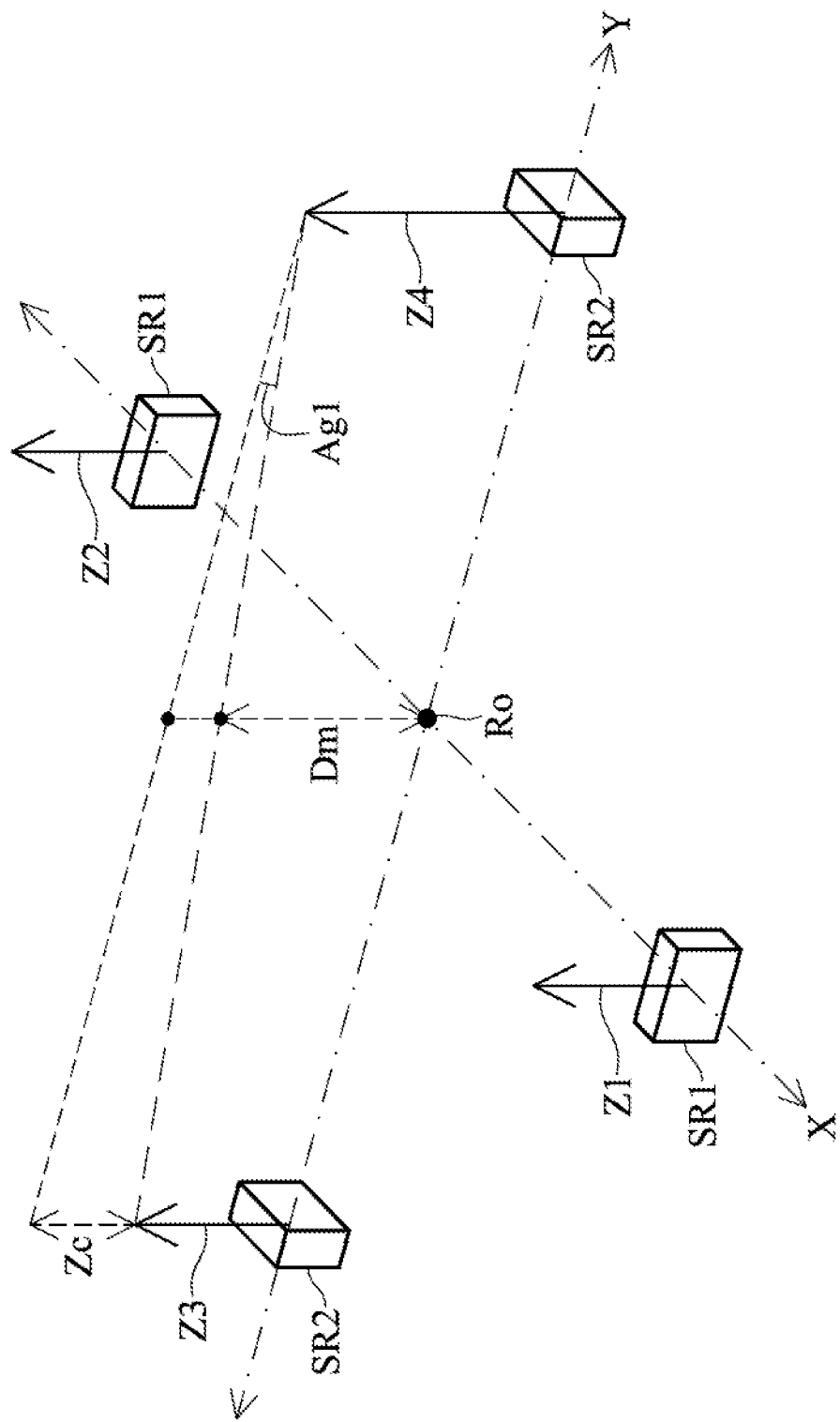
FIG. 5 shows a diagram of the movement of the second magnetic elements which is sensed by the corresponding first sensors and the second sensors in FIG. 2 according to an embodiment of the present disclosure.

Please refer to FIG. 5, which shows a diagram of the movement of the second magnetic elements MEG2 which is sensed by the corresponding first sensors SR1 and the second sensors SR2 in FIG. 2 according to an embodiment of the present disclosure. In this embodiment, the magnitudes of the vector Z1 and the vector Z2 respectively represent the displacement of the two corresponding second magnetic elements MEG2 along the Z-axis direction which are sensed by the two first sensors SR1, and the magnitudes of the vectors Z3 and Z4 respectively represent the displacement of the two corresponding second magnetic elements MEG2 along the Z-axis direction which are sensed by the two second sensors SR2. For example, the vector Z1 and the vector Z2 in FIG. 5 have the same magnitude, and the magnitude of the vector Z3 is less than that of the vector Z4. Thus, the control unit 150 can obtain a first rotation angle of the optical member holder 108 when rotating around the first axis Ax according to the magnitudes of the vector Z3 and the vector Z4. For example, the first rotation angle Ag1 can be calculated by the distance between the two second sensors SR2 along the Y-axis direction, the magnitudes of the vector Z3 and the vector Z4 (according to the trigonometric function formula).

In addition, the control unit 150 can further obtain the displacement Dm of the optical member holder 108 along the optical axis O. As shown in FIG. 5, a reference origin Ro can be defined as the center point between two second sensors SR2. Then, because the distances between the two second sensors SR2 and the reference origin Ro are equal, the displacement Dm=(Z3+Z4)/2.

Next, the control unit 150 can drive the optical member holder 108 to rotate around the first axis Ax according to the information related to the first rotation angle. That is, the control unit 150 controls the driving assembly corresponding to the second sensor SR2 at the left side to generate an electromagnetic driving force, to control optical member holder 108 to rotate, so as to move a compensation distance Zc. In this embodiment, Z4=Z3+Zc. Therefore, the optical axis O of the optical member holder 108 and the optical axis Os of the image-sensing element 115 can be located on the same axis, so as to achieve the purpose of compensating for titling. Similarly, when the magnitudes of the vector Z1 and the vector Z2 are not the same, the control unit 150 can also obtain the second rotation angle of the optical member holder 108 when rotating around the second axis Ay according to the magnitudes of the vector Z1 and the vector Z2, and correspondingly drives the optical member holder 108 to rotate, so as to compensate for the second rotation angle.

Figure 6:
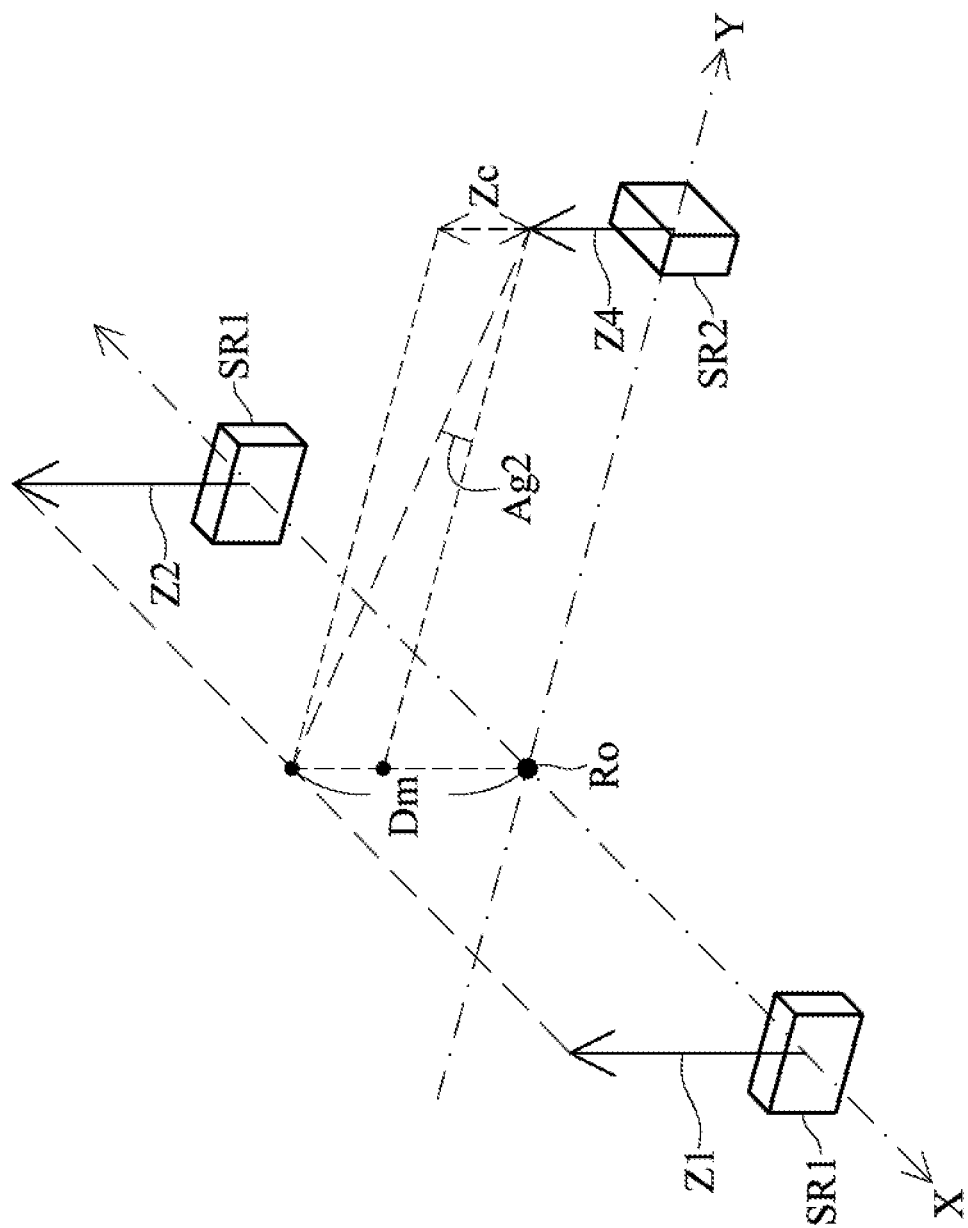
FIG. 6 shows a diagram of the movement of the second magnetic element which is sensed by the corresponding first sensor and the second sensor according to another embodiment of the present disclosure.

Please refer to FIG. 6, which shows a diagram of the movement of the second magnetic element MEG2 which is sensed by the corresponding first sensor SR1 and the second sensor SR2 according to another embodiment of the present disclosure. This embodiment is similar to the embodiment of FIG. 5, and the difference between these two embodiments is that the optical system in this embodiment only includes two first sensors SR1 and one second sensor SR2 for obtaining the position information and the angle information of the optical member holder 108. In addition, in this embodiment, the two first sensors SR1 are arranged along the X-axis direction (parallel to the first axis Ax), and the second sensor SR2 is located on the Y-axis direction. Specifically, the second sensor SR2 is disposed at one side of the optical member holder 108 and is adjacent to the two first sensors SR1. Similar to the embodiment in FIG. 5, the control unit 150 can obtain the displacement Dm of the optical member holder 108 along the optical axis O according to the magnitudes of the vector Z1 and the vector Z2. As shown in FIG. 6, the reference origin Ro can be defined as the center point between the two first sensors SR1. Then, because the distances between the two first sensors SR1 and the reference origin Ro are equal, the displacement Dm=(Z1+Z2)/2. Furthermore, the control unit 150 can further obtain the second rotation angle of the optical member holder 108 when rotating around the second axis Ay according to the magnitudes of the vector Z1 and the vector Z2. For example, the second rotation angle can be calculated by the distance between the two first sensors SR1 along the X-axis direction, the magnitudes of the vector Z1 and the vector Z2 (according to the trigonometric function formula).

In addition, the control unit 150 can calculate the first rotation angle (such as the angle Ag2 in FIG. 6) of the optical member holder 108 when rotating around the first axis Ax by the displacement Dm, the magnitude of the vector Z4 and the distance between the second sensor SR2 and the reference origin Ro according to the trigonometric function formula. Then, the control unit 150 can control the driving assembly corresponding to the second sensor SR2 to generate an electromagnetic driving force along the Z-axis direction, to drive the optical member holder 108 to rotate, so as to move a compensation distance Zc. In this embodiment, Dm=Z4+Zc.

It should be noted that the storage unit 170 of the control unit 150 can store an angle-displacement table in advance. In this embodiment, the angle-displacement table can be a data table including the first rotation angle and the corresponding compensation distance. Therefore, when the control unit 150 determines that the optical member holder 108 rotates the first rotation angle (such as the angle Ag2), the control unit 150 can refer to the angle-displacement table and directly controls the driving assembly to drive the optical member holder 108 to move the corresponding compensation distance Zc.

In addition, the control unit 150 can also store initial information related to the optical member holder 108. The initial information includes the position information and the angle information of the optical element carrier 108 when the optical member holder 108 is not activated. For example, as shown in FIG. 5, the position information can include the displacement Dm in FIG. 5, and the angle information can include, for example, the first rotation angle (such as the angle Ag1 in FIG. 5) or the second rotation angle. Therefore, when the optical system 100 is activated, the control unit 150 can immediately drive the optical member holder 108 to compensate for the displacement and the angle of tilt according to the position information and the angle information, so that the optical axis O of the optical member holder 108 is aligned with the optical axis Os of the image-sensing element 115. That is, the control unit 150 can immediately perform the procedure of compensating for the static tilt when the optical system 100 is activated.

Figure 7:
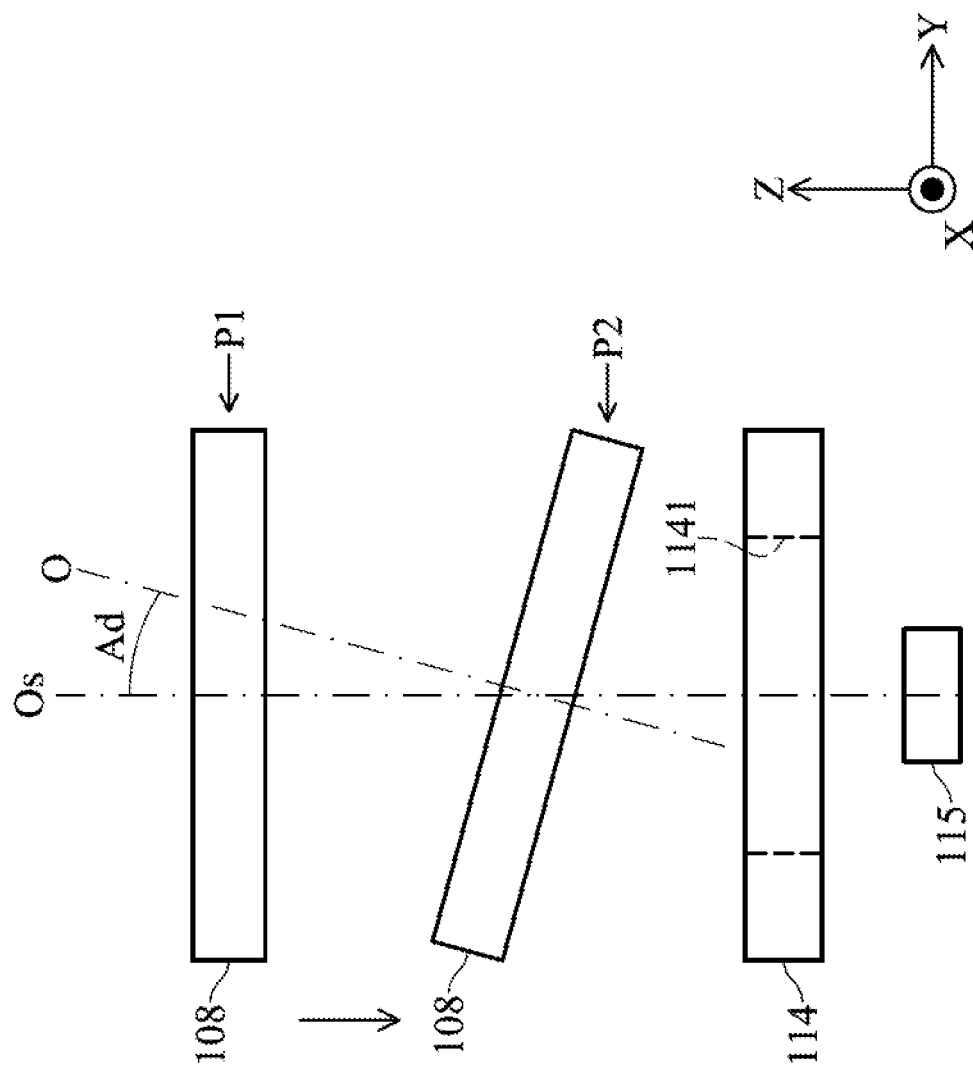
FIG. 7 shows a diagram illustrating that optical member holder is located at different positions relative to the image-sensing element in FIG. 2 according to the embodiment of the present disclosure.

Please refer to FIG. 7, which shows a diagram illustrating that optical member holder 108 is located at different positions relative to the image-sensing element 115 in FIG. 2 according to the embodiment of the present disclosure. As shown in FIG. 7, when the optical member holder 108 is driven to move along the Z-axis direction, there may be a problem of a dynamic tilt. For example, when the optical member holder 108 is moved from the position P1 to the position P2, the optical member holder 108 is tilted at the position P2, so that an included angle Ad is formed between the optical axis O and the optical axis Os. For solving this problem, the control unit 150 can further store dynamic information related to the movable module (such as the optical member holder 108), and the dynamic information includes position variation information and angle variation information about the movable module when it operates within a predetermined range. In this embodiment, the dynamic information includes information about angles corresponding to the optical member holder 108 at different positions along the Z-axis direction. The predetermined range is defined as a range to ensure that the driving assembly can effectively control the optical member holder 108. For example, in FIG. 7, the position P1 is an upper limit position of the predetermined range. When the position of the optical member holder 108 is lower than the position P1, it can be ensured that the driving assembly can effectively control the optical member holder 108.

As a result, based on the design of the control unit 150 storing the dynamic information related to the movable module in advance, when the optical member holder 108 is moved to different positions along the Z-axis direction and the dynamic tilt is occurred, the control unit 150 can instantly control the driving assembly to compensate for this dynamic tilt, so that the optical axis O can be aligned with the optical axis Os. In addition, it should be noted that when the control unit 150 compensates for the dynamic tilt, the control unit 150 can choose a certain position of the optical member holder 108 to serve as a reference point. For example, as shown in FIG. 7, when the optical member holder 108 is at the highest point (the position P1), the optical axis O of the optical member holder 108 is aligned with the optical axis Os of the image-sensing element 115. Therefore, the control unit 150 can choose position P1 to serve as the reference point, and then can perform a procedure to compensate for the dynamic tilt of optical member holder 108 at other positions.

Figure 8:
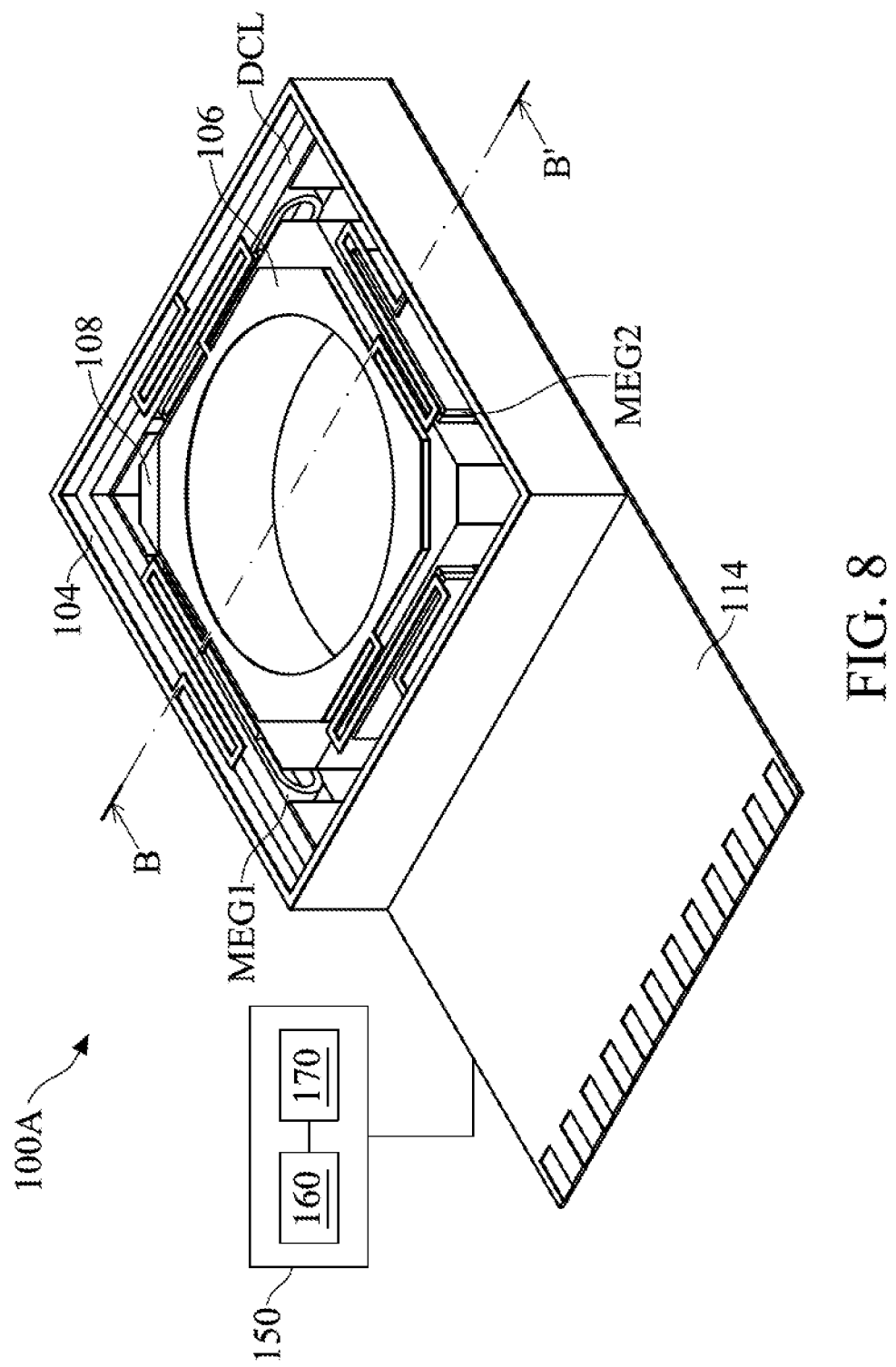
FIG. 8 shows a schematic diagram of an optical system according to another embodiment of the present disclosure.
Figure 9:
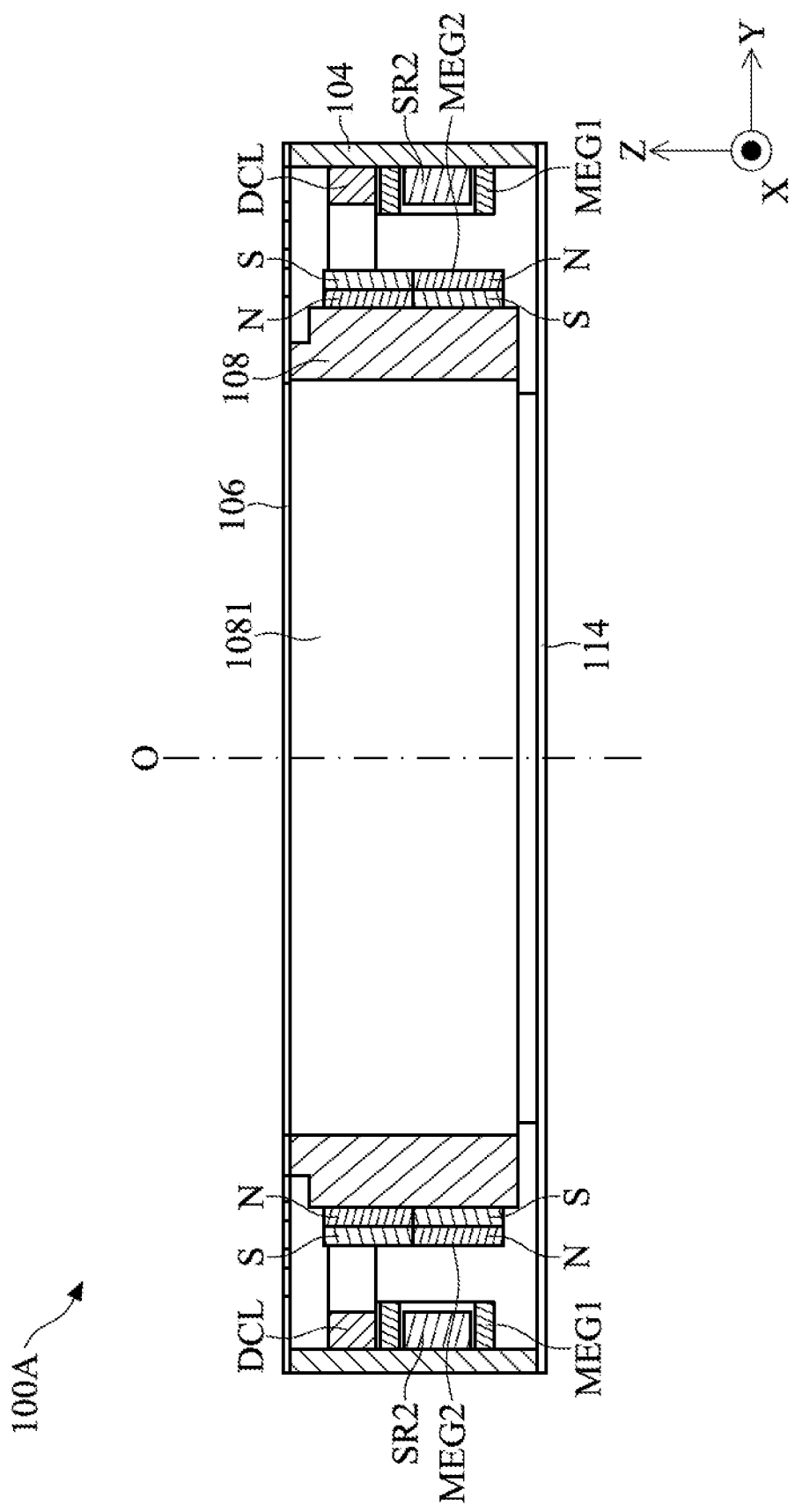
FIG. 9 is a cross-sectional view of the optical system along line B-B' in FIG. 8 according to the embodiment of the present disclosure.

Please refer to FIG. 8 and FIG. 9. FIG. 8 shows a schematic diagram of an optical system 100A according to another embodiment of the present disclosure. FIG. 9 is a cross-sectional view of the optical system 100A along line B-B' in FIG. 8 according to the embodiment of the present disclosure. The optical system 100A of this embodiment is similar to the optical system 100. The difference between these two embodiments is that the optical system 100A further includes a driving coil DCL, which is fixedly disposed on the outer frame 104. The driving coil DCL corresponds to the four second magnetic elements MEG2 and is configured to generate an electromagnetic driving force to drive the optical member holder 108 to move along the optical axis O direction.

It should be noted that, as shown in FIG. 9, the second magnetic element MEG2 in this embodiment is a multi-pole magnet, which corresponds to the first magnetic elements MEG1 and the driving coil DCL together. Moreover, when viewed along the optical axis O, the driving coil DCL partially overlaps the first magnetic elements MEG1. Based on the structural design mentioned above, the widths of the optical system 100A along the X-axis direction and the Y-axis direction can be further reduced, so as to achieve the purpose of miniaturization.

Similar to the previous embodiment, when the optical member holder 108 tilts, the control unit 150 can compensate for tilting according to information related to the first rotation angle and the second rotation angle which is obtained by the first sensors SR1 and the second sensors SR2. The method of controlling the optical member holder 108 to rotate by the control unit 150 to compensate for the tilting is similar to that of the previous embodiment, and therefore the description is omitted herein.

Figure 10:
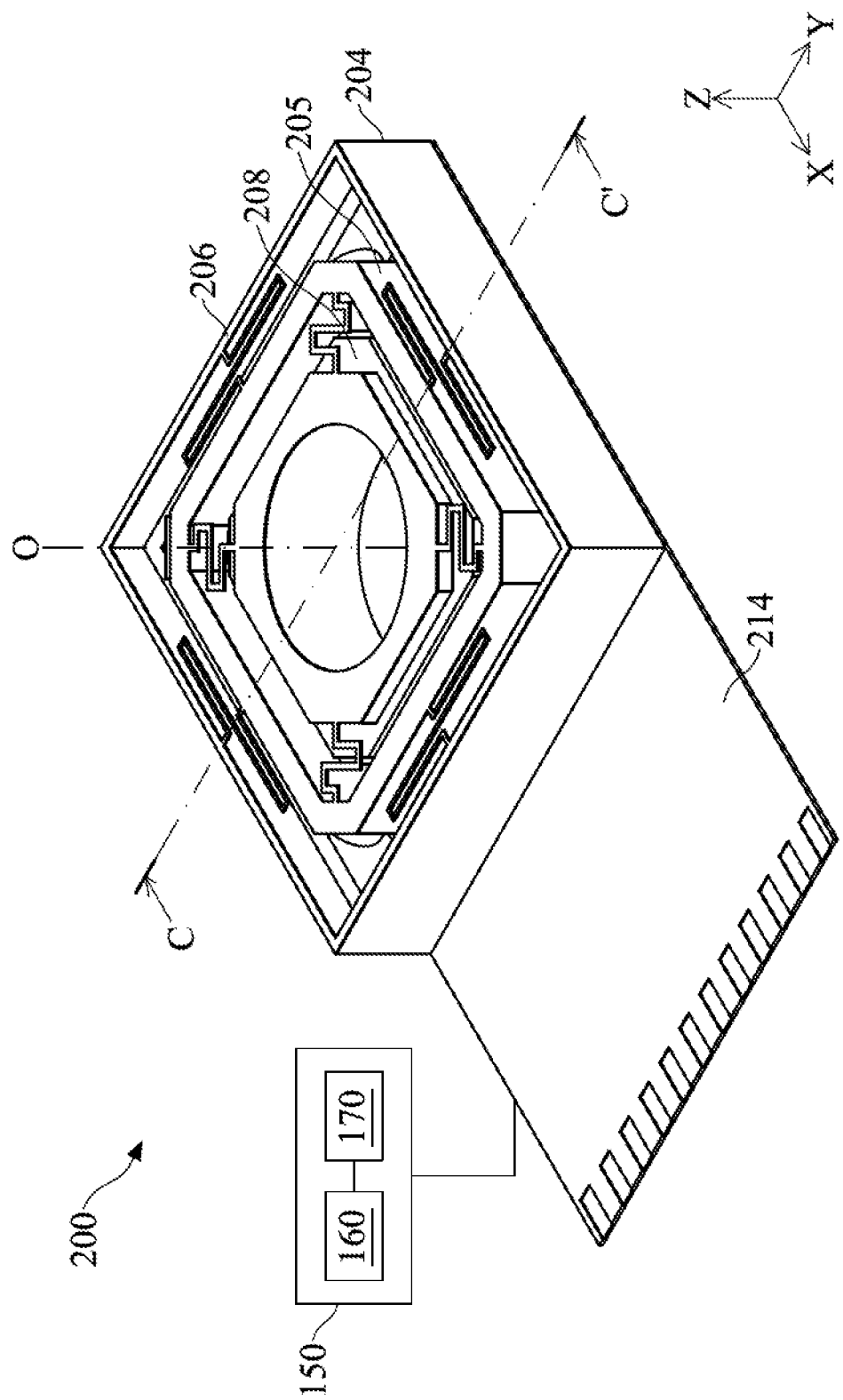
FIG. 10 shows a schematic diagram of an optical system according to another embodiment of the present disclosure.
Figure 11:
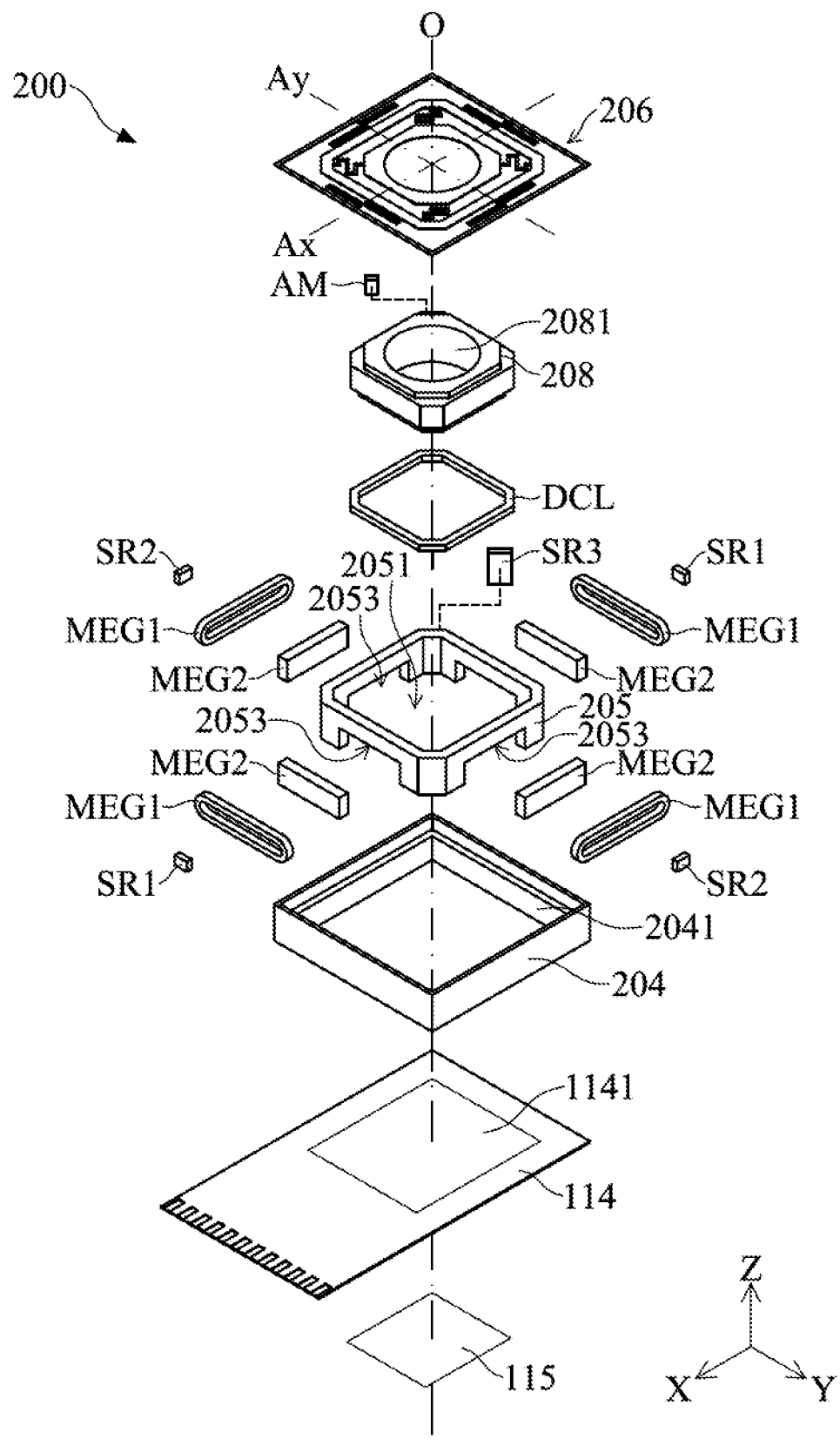
FIG. 11 shows an exploded diagram of the optical system according to the embodiment of the present disclosure.
Figure 12:
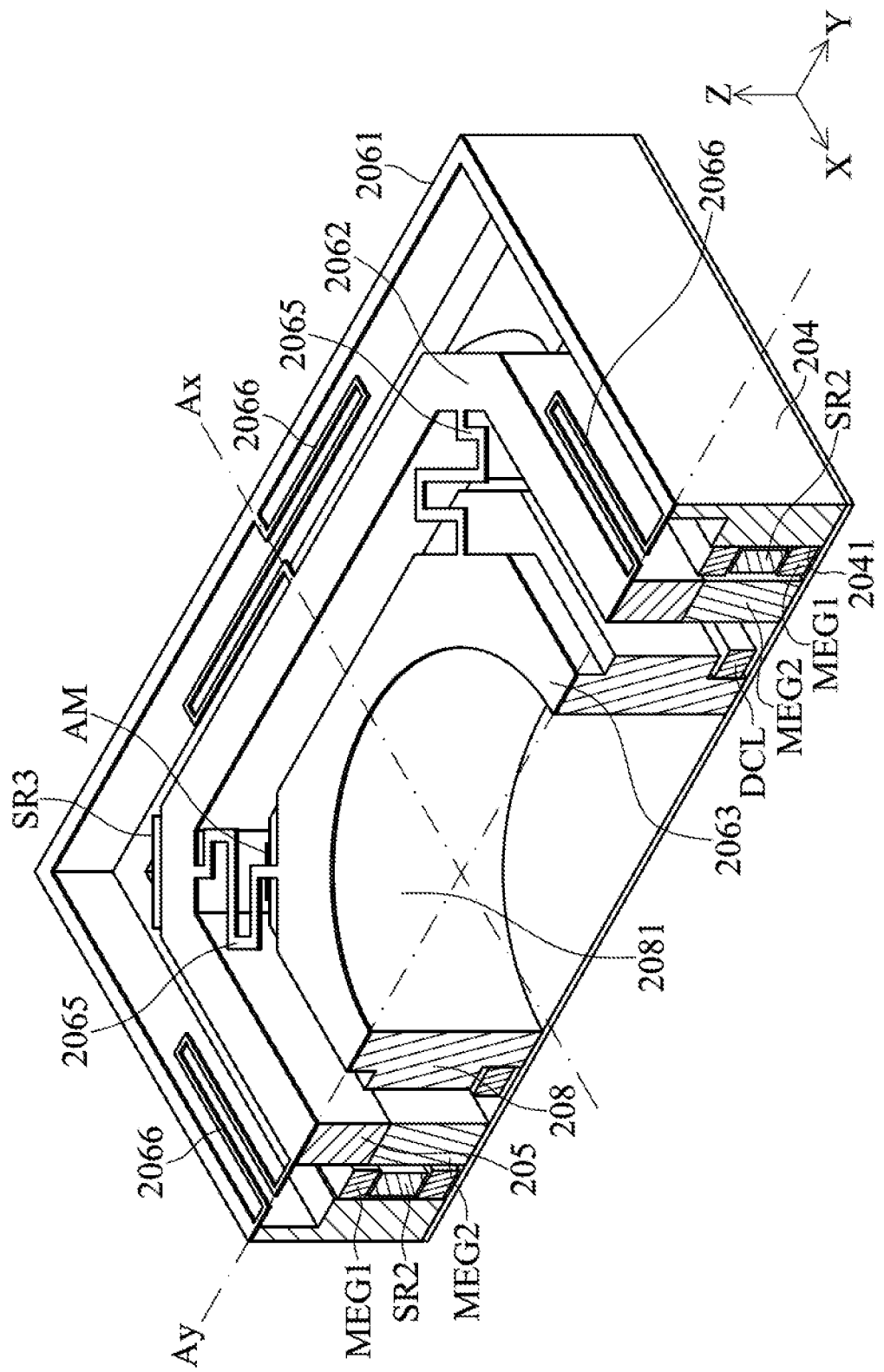
FIG. 12 shows a cross-sectional view along line C-C' in FIG. 10 according to the embodiment of the present disclosure.

Please refer to FIG. 10 to FIG. 12. FIG. 10 shows a schematic diagram of an optical system 200 according to another embodiment of the present disclosure, FIG. 11 shows an exploded diagram of the optical system 200 according to another embodiment of the present disclosure, and FIG. 12 shows a cross-sectional view along line C-C' in FIG. 10 according to another embodiment of the present disclosure. As shown in the figures, the optical system 200 includes an outer frame 204, a frame 205, a spring sheet 206, an optical member holder 208, a driving coil DCL, an induction magnet AM, a plurality of first magnetic elements MEG1, a plurality of second magnetic elements MEG2, a sensing unit, a circuit board 114, an image-sensing element 115 and a control unit 150 (the control unit 150 is omitted in FIG. 11). The outer frame 204 is fixedly connected to the circuit board 114, and the outer frame 204 and the circuit board 114 can collectively form a fixed module. The fixed module can include other members in other embodiments. For example, the fixed module can further include an upper casing (not shown) which is fixedly connected to the outer frame 204. Furthermore, the optical member holder 208 and the frame 205 can collectively form a movable module, and the movable module can move relative to the fixed module.

The optical member holder 208 is configured to hold an optical member and lock the optical member in a through hole 2081, and the driving coil DCL is disposed around the bottom side of the optical member holder 208. In addition, as shown in FIG. 11, the frame 205 includes a central opening 2051 and four grooves 2053. The central opening 2051 can accommodate the optical member holder 208 and the driving coil DCL, and the grooves 2053 are configured to accommodate the four second magnetic elements MEG2, but the number of the grooves 2053 and the second magnetic elements MEG2 is not limited to this embodiment. In this embodiment, the shape of the second magnetic element MEG2 can include a long-strip structure, but it is not limited thereto. For example, it can include different shapes in other embodiments.

In this embodiment, when the driving coil DCL is provided with electricity, the driving coil DCL acts with the first magnetic elements MEG1 to generate the electromagnetic driving force, so as to drive the optical member holder 208 to move along the optical axis O. In addition, the first magnetic element MEG1 can be a coil and corresponds to the second magnetic element MEG2, and these first magnetic elements MEG1 are fixedly disposed on an inner surface 2041 of the outer frame 204. In addition, in this embodiment, two first magnetic elements MEG1 and two second magnetic elements MEG2 are arranged along the X-axis direction, and the other two first magnetic elements MEG1 and the other two second magnetic elements MEG2 are arranged along the Y-axis direction. As shown in FIG. 11, the direction of the first axis Ax is parallel to the X-axis direction, the direction of the second axis Ay is parallel to the Y-axis direction, and the first axis Ax and the second axis Ay are perpendicular to the optical axis O. Specifically, the first axis Ax and the second axis Ay cross the optical axis O.

As shown in FIG. 11 and FIG. 12, in this embodiment, the sensing unit can include two first sensors SR1, two second sensors SR2, and a third sensor SR3. The first sensors SR1 and the second sensors SR2 can be fixedly disposed on the inner surface 2041 of the outer frame 204, and the first magnetic element MEG1 can surround the corresponding first sensor SR1 or the corresponding second sensors SR2. The first sensors SR1 and the second sensors SR2 are configured to sense the movement of the corresponding second magnetic elements MEG2. Similar to the previous embodiment, two first sensors SR1 are arranged along a direction which is parallel to the first axis Ax (the X-axis direction), and two second sensors SR2 are arranged along a direction which is parallel to the second axis Ay (the Y-axis direction). In addition, the third sensor SR3 is disposed on the frame 205 and located in a corner of the optical member holder 208. The third sensor SR3 is configured to sense the induction magnet AM, so as to obtain the displacement of the optical member holder 208 along the optical axis O relative to the fixed module.

As shown in FIG. 12, the optical member holder 208 and the frame 205 can be connected to the outer frame 204 by the spring sheet 206, so as to be suspended in the outer frame 204. In this embodiment, the spring sheet 206 can be an elastic member, and the spring sheet 206 can include an outer ring portion 2061, a middle ring portion 2062, an inner ring portion 2063, a plurality of connecting portions 2065 and a plurality of connecting portions 2066. The inner ring portion 2063 is fixedly connected to the optical member holder 208, the middle ring portion 2062 is fixedly connected to the frame 205, and the outer ring portion 2061 is fixedly connected to the outer frame 204. Moreover, the inner ring portion 2063 is connected to the middle ring portion 2062 by the plurality of connecting portions 2065, and the middle ring portion 2062 is connected to the outer ring portion 2061 by the plurality of connecting portions 2066.

It should be noted that the outer ring portion 2061, the middle ring portion 2062 and the inner ring portion 2063 have a greater elastic coefficient than the connecting portions 2065 and the connecting portions 2066, so that when the optical member holder 208 is moved relative to the frame 205 along the optical axis O, it can be ensured that the optical member holder 208 does not easily rotate relative to the frame 205. Moreover, as shown in FIG. 11 and FIG. 12, the spring sheet 206 defines a first axis Ax and a second axis Ay. The inner ring portion 2063 and the middle ring portion 2062 can be rotated around the first axis Ax or the second axis Ay relative to the outer ring portion 2061. That is, the optical member holder 208 and the frame 205 can be rotated around the first axis Ax or the second axis Ay.

Figure 13:
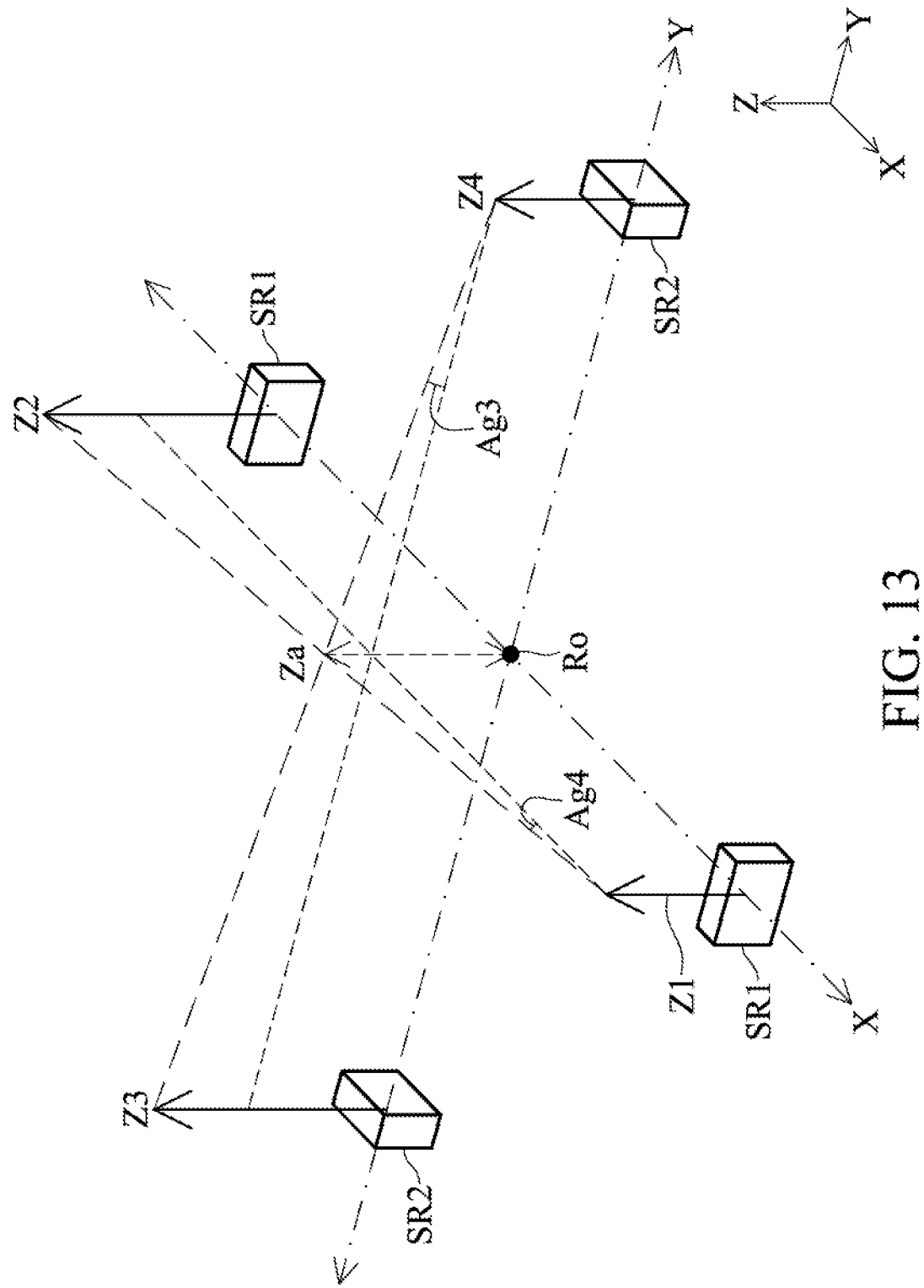
FIG. 13 shows a diagram of the movement which is sensed by the sensing unit in FIG. 11 according to an embodiment of the present disclosure.

Please refer to FIG. 13, which shows a diagram of the movement which is sensed by the sensing unit in FIG. 11 according to an embodiment of the present disclosure. In this embodiment, the magnitudes of the vector Z1 and the vector Z2 respectively represent the displacement of the two corresponding second magnetic elements MEG2 along the Z-axis direction which are sensed by the two first sensors SR1, and the magnitudes of the vector Z3 and the vector Z4 respectively represent the displacement of the two corresponding second magnetic elements MEG2 along the Z-axis direction which are sensed by the two second sensors SR2. The vector Za represents the displacement of the induction magnet AM which is sensed by the third sensor SR3.

Similar to the embodiment in FIG. 5, the control unit 150 can obtain a first rotation angle Ag3 of the frame 205 and the optical member holder 208 when rotating around the first axis Ax according to the magnitudes of the vector Z3 and the vector Z4, and the control unit 150 can also obtain a second rotation angle Ag4 of the frame 205 and the optical member holder 208 when rotating around the second axis Ay according to the magnitudes of the vector Z1 and the vector Z2. Furthermore, the control unit 150 can also obtain the displacement of the optical member holder 208 along the optical axis O according to the magnitude of the vector Za. After obtaining the angle information and the position information related to the frame 205 and the optical member holder 208, the control unit 150 can control the driving assembly to drive the optical member holder 208 to perform the compensation procedure. The method of compensation is similar to that of the previous embodiment, and the description about the method of compensation is omitted herein.

Figure 14:
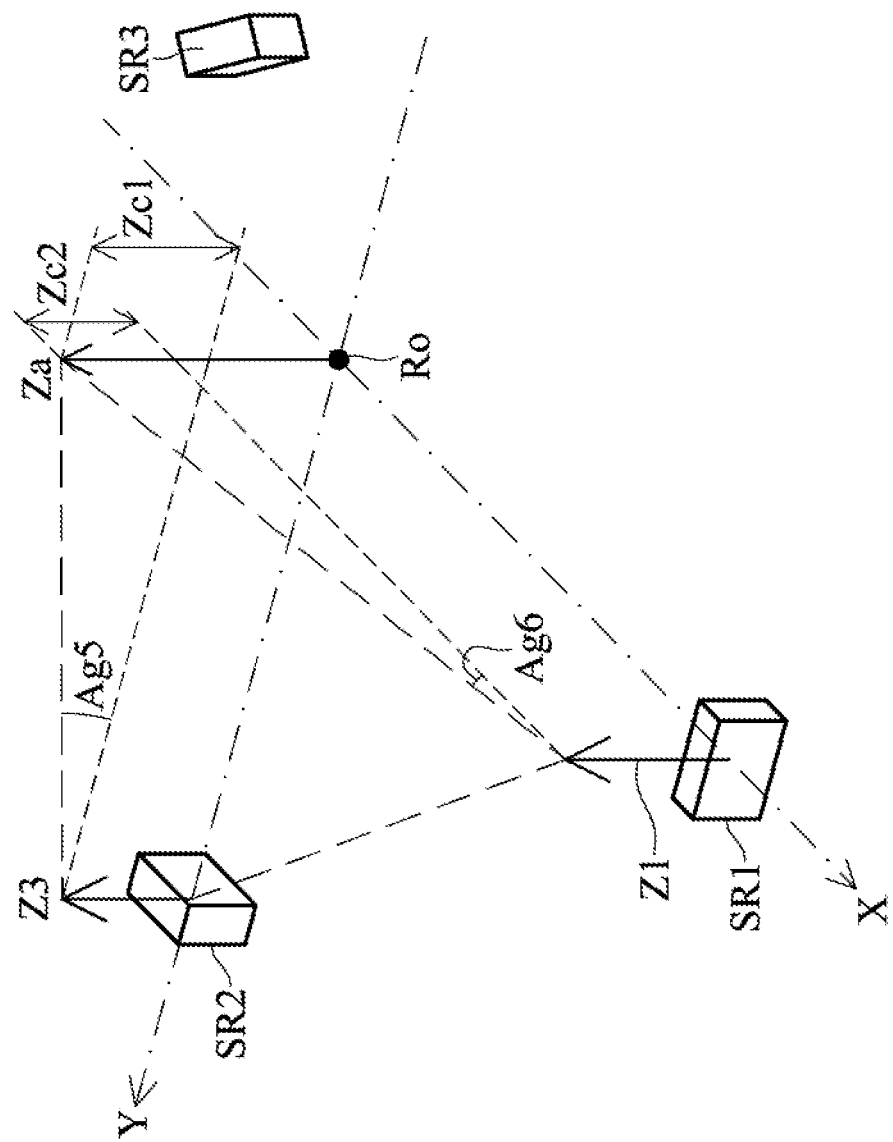
FIG. 14 shows a diagram of the movement which is sensed by the sensing unit according to another embodiment of the present disclosure.

Please refer to FIG. 14, which shows a diagram of the movement which is sensed by the sensing unit according to another embodiment of the present disclosure. This embodiment is similar to the embodiment in FIG. 11, and the difference is that the sensing unit in this embodiment only includes one first sensor SR1, one second sensor SR2 and one third sensor SR3. The first sensor SR1 and the second sensor SR2 are disposed on two adjacent sides of the optical member holder (such as the optical member holder 208 in FIG. 11), and the third sensor SR3 is disposed in a corner of the optical member holder 208. Specifically, the first sensor SR1 is located on the X-axis, and the second sensor SR2 is located on the Y-axis. In this embodiment, the first sensor SR1, the second sensor SR2, or the third sensor SR3 can be a magnetic field sensing element, such as a Hall effect sensor, a MR sensor, a fluxgate sensor, and so on, but they are not limited thereto.

As shown in FIG. 14, the magnitude of the vector Z1 represents the displacement of the corresponding second magnetic element MEG2 along the Z-axis direction which is sensed by the first sensor SR1, and the magnitude of the vector Z3 represents the displacement of the corresponding second magnetic element MEG2 along the Z-axis direction which is sensed by the second sensor SR2. The magnitude of the vector Za represents the displacement of the induction magnet AM which is sensed by the third sensor SR3.

In this embodiment, the control unit 150 can calculate a first rotation angle Ag5 according to the magnitudes of the vector Za and the vector Z3 and the distance between the second sensor SR2 and the reference origin Ro (according to the trigonometric function formula). Then, the control unit 150 can control the driving assembly corresponding to the second sensor SR2 to generate an electromagnetic driving force along the Z-axis direction, to drive the frame 205 and the optical member holder 208 to rotate, so as to move a compensation distance Zc1. In this embodiment, Za=Z3+Zc1.

Similarly, the control unit 150 can calculate a second rotation angle Ag6 according to the magnitudes of the vector Za and the vector Z1 and the distance between the first sensor SR1 and the reference origin Ro (according to the trigonometric function formula). Then, the control unit 150 can control the driving assembly corresponding to the first sensor SR1 to generate an electromagnetic driving force along the Z-axis direction, to drive the frame 205 and the optical member holder 208 to rotate, so as to move a compensation distance Zc2. In this embodiment, Za=Z1+Zc2.

Because only one first sensor SR1, one second sensor SR2 and one third sensor SR3 are needed in this embodiment to obtain the position information and angle information of the optical member holder 208. Therefore, the manufacturing cost can be further reduced, and the purpose of miniaturization can be achieved.

It should be noted that, similar to the previous embodiment, the storage unit 170 of the control unit 150 can store an angle-displacement table in advance, and the angle-displacement table can be a data table including the first rotation angle, the second rotation angle and the corresponding compensation distance. For example, when the control unit 150 determines that the optical member holder 208 rotates at the first rotation angle Ag5, the control unit 150 can refer to the angle-displacement table and directly control the driving assembly to drive the optical member holder 208 to rotate, so as to move the corresponding compensation distance Zc1.

In conclusion, the present disclosure provides an optical system which includes a sensing unit, a driving assembly, and a control unit. When the optical member holder is moved to perform the auto-focusing function, the optical member holder may tilt, such that the optical axis O of the optical member holder is not aligned with the optical axis Os of the image-sensing element 115. At this time, the sensing unit can sense the information related to the first rotation angle of the optical member holder when rotating around the first axis and/or the second rotation angle when rotating around the second axis, and then the control unit 150 can control the driving assembly to drive the optical member holder to rotate according to the information, so as to achieve the purpose of compensating for the angle of tilt.

Furthermore, when the optical system is not activated, the optical member holder may have an angle of tilt relative to the image-sensing element 115. Therefore, when the optical system is activated, the control unit 150 can immediately drive the optical member holder to compensate for the angle of tilt, so that the optical axis O of the optical member holder is aligned with the optical axis Os of the image-sensing element 115, so as to obtain a clear image.

In addition, the number of sensors in the sensing unit of the optical system may depend on practical requirements. For example, in some embodiments, the optical system can only include one first sensor SR1, one second sensor SR2 and one third sensor SR3, which are configured to respectively sense the displacement, the first rotation angle or the second rotation angle of the optical member holder. Based on the configuration, the manufacturing cost can be reduced further, and the purpose of miniaturization can be achieved.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
    a fixed module, comprising an outer frame;
    a movable module, comprising an optical member holder, configured to hold an optical member having an optical axis;
    a sensing unit, configured to sense a movement of the movable module relative to the fixed module, comprising:
        a plurality of first sensing elements, configured to sense the rotation of the movable module relative to the fixed module in a first axis;
        a plurality of second sensing elements, configured to sense the rotation of the movable module relative to the fixed module in a second axis; and
    a driving assembly, configured to drive the movable module to move relative to the fixed module, comprising:
        a first magnetic element;
        a first driving coil, configured to correspond to the first magnetic element to drive the movable module to rotate around the second axis relative to the fixed module, wherein a winding axis of the first driving coil is not parallel to the optical axis, and the first magnetic element and the first driving coil are at least partially overlapped as viewed in a direction that is parallel to the first axis;
        a second magnetic element;

a second driving coil, configured to correspond to the second magnetic element to drive the movable module to rotate around the first axis relative to the fixed module, wherein a winding axis of the second driving coil is not parallel to the optical axis, and the second magnetic element and the second driving coil are at least partially overlapped as viewed in a direction that is parallel to the second axis;

wherein the first axis or the second axis is perpendicular to the optical axis of the optical member;

wherein the second sensing elements and the first magnetic element are at least partially overlapped as viewed in the direction that is parallel to the first axis;

wherein the first sensing elements and the second magnetic element are at least partially overlapped as viewed in the direction that is parallel to the second axis.

2. The optical system as claimed in claim 1, wherein the number of the first magnetic element, the second magnetic element, the first driving coil, and the second driving coil are plural respectively, a plurality of first magnetic elements and a plurality of second magnetic elements are disposed on the outer frame and arranged along a direction parallel to the first axis and along a direction parallel to the second axis respectively, and a plurality of first driving coils corresponding to the first magnetic elements and a plurality of second driving coils corresponding to the second magnetic elements are arranged along a direction parallel to the first axis and along a direction parallel to the second axis respectively, wherein the sensing unit is disposed on the outer frame, and the first axis and the second axis cross the optical axis.

3. The optical system as claimed in claim 2, wherein the optical system further comprises an elastic member and a frame, the elastic member includes an inner ring portion, a middle ring portion and an outer ring portion, the inner ring portion is connected to the optical member holder, the middle ring portion is connected to the frame, and the outer ring portion is connected to the outer frame;

wherein the inner ring portion and the middle ring portion rotate relative to the outer ring portion around the first axis or the second axis.

4. The optical system as claimed in claim 2, wherein the driving assembly further includes a driving coil corresponding to the first magnetic elements and the second magnetic elements, configured to generate an electromagnetic driving force to drive the optical member holder to move along the optical axis.

5. The optical system as claimed in claim 4, wherein when viewed along the optical axis, the driving coil partially overlaps the first driving coils and the second driving coils.

6. The optical system as claimed in claim 1, wherein the driving assembly further drives the optical member holder to move along the optical axis.

7. The optical system as claimed in claim 1, wherein the number of the first sensing element and the second sensing elements are two respectively, and two first sensing elements arranged along a direction parallel to the second axis are configured to sense the rotation of the movable module relative to the fixed module in the first axis, and two second sensing elements arranged along a direction parallel to the first axis are configured to sense the rotation of the movable module relative to the fixed module in the second axis.

8. The optical system as claimed in claim 7, wherein the first sensing elements and the second sensing elements are configured to further obtain displacement of the optical member holder along the optical axis.

9. The optical system as claimed in claim 7, wherein the sensing unit further includes a third sensor, configured to sense displacement of the optical member holder along the optical axis.

10. The optical system as claimed in claim 1, wherein the optical system further comprises a control unit which includes initial information related to the movable module, wherein the initial information includes position information and angle information about the movable module when the movable module is not activated.

11. The optical system as claimed in claim 10, wherein the control unit further includes dynamic information related to the movable module, wherein the dynamic information includes position variation information and angle variation information about the movable module when the movable module operates within a predetermined range.

12. An optical system, comprising:
a fixed module, comprising an outer frame;
a movable module, comprising an optical member holder, configured to hold an optical member having an optical axis;
a sensing unit, configured to sense a movement of the movable module relative to the fixed module, comprising:
  a first sensing element, disposed at one side of the optical member holder;
  two second sensing elements, configured to sense the rotation of the movable module relative to the fixed module in a second axis, arranged along a direction parallel to a first axis, wherein the first sensing element is adjacent to the second sensing elements; and
a driving assembly, configured to drive the movable module to move relative to the fixed module, comprising:
a first magnetic element;
a first driving coil, configured to correspond to the first magnetic element to drive the movable module to rotate around the second axis relative to the fixed module,
a second magnetic element;
a second driving coil, configured to correspond to the second magnetic element to drive the movable module to rotate around the first axis relative to the fixed module, wherein a winding axis of the second driving coil is not parallel to the optical axis, and the second magnetic element and the second driving coil are at least partially overlapped as viewed in a direction that is parallel to the second axis;
wherein the first axis or the second axis is perpendicular to the optical axis of the optical member;
wherein the second sensing elements and the first magnetic element are at least partially overlapped as viewed in the direction that is parallel to the first axis;
wherein the first sensing element and the second magnetic element are at least partially overlapped as viewed in the direction that is parallel to the second axis.

13. An optical system, comprising:
a fixed module, comprising an outer frame;
a movable module, comprising an optical member holder, configured to hold an optical member having an optical axis;
a sensing unit, configured to sense a movement of the movable module relative to the fixed module, comprising a first sensing element, a second sensing element and a third sensing element, the first sensing element and the second sensing element are disposed on two adjacent sides of the optical member holder, and the third sensing element is disposed in a corner of the optical member holder; and a driving assembly, configured to drive the movable module to move relative to the fixed module, comprising:

a first magnetic element;

a first driving coil, configured to correspond to the first magnetic element to drive the movable module to rotate around the second axis relative to the fixed module, a second magnetic element;

a second driving coil, configured to correspond to the second magnetic element to drive the movable module to rotate around the first axis relative to the fixed module, wherein a winding axis of the second driving coil is not parallel to the optical axis, and the second magnetic element and the second driving coil are at least partially overlapped as viewed in a direction that is parallel to the second axis;

wherein the first axis or the second axis is perpendicular to the optical axis of the optical member;

wherein the second sensing element and the first magnetic element are at least partially overlapped as viewed in the direction that is parallel to the first axis;

wherein the first sensing element and the second magnetic element are at least partially overlapped as viewed in the direction that is parallel to the second axis.

* * * * *